April 15, 1930.   H. B. SHIELDS   1,754,286
TRANSMISSION BRAKE
Original Filed March 23, 1926   2 Sheets-Sheet 1
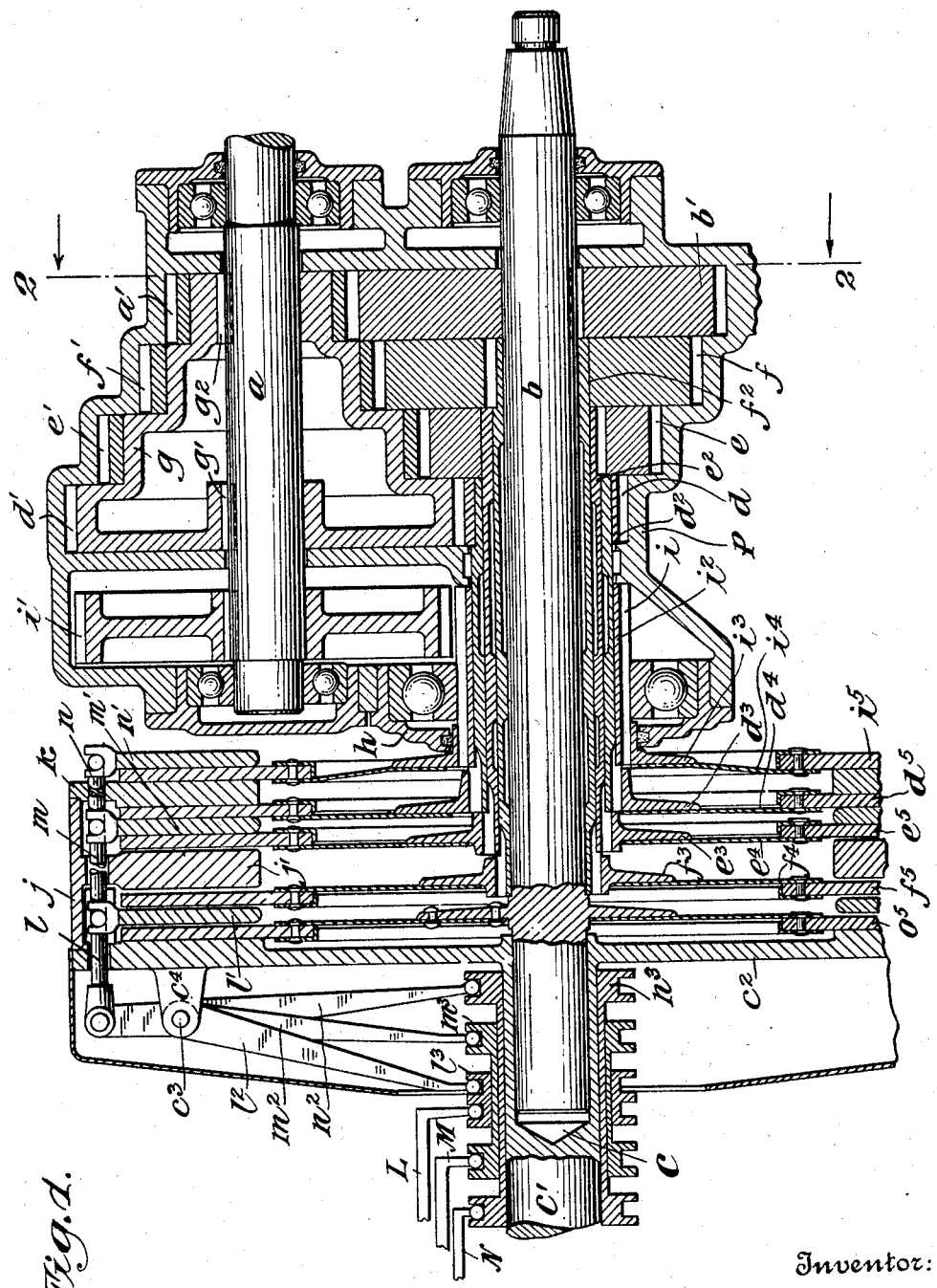
Inventor:
Henry B. Shields
By his Attorneys
Redding, Greeley, O'Shea & Campbell April 15, 1930.   H. B. SHIELDS   1,754,286
TRANSMISSION BRAKE
Original Filed March 23, 1926   2 Sheets-Sheet 2
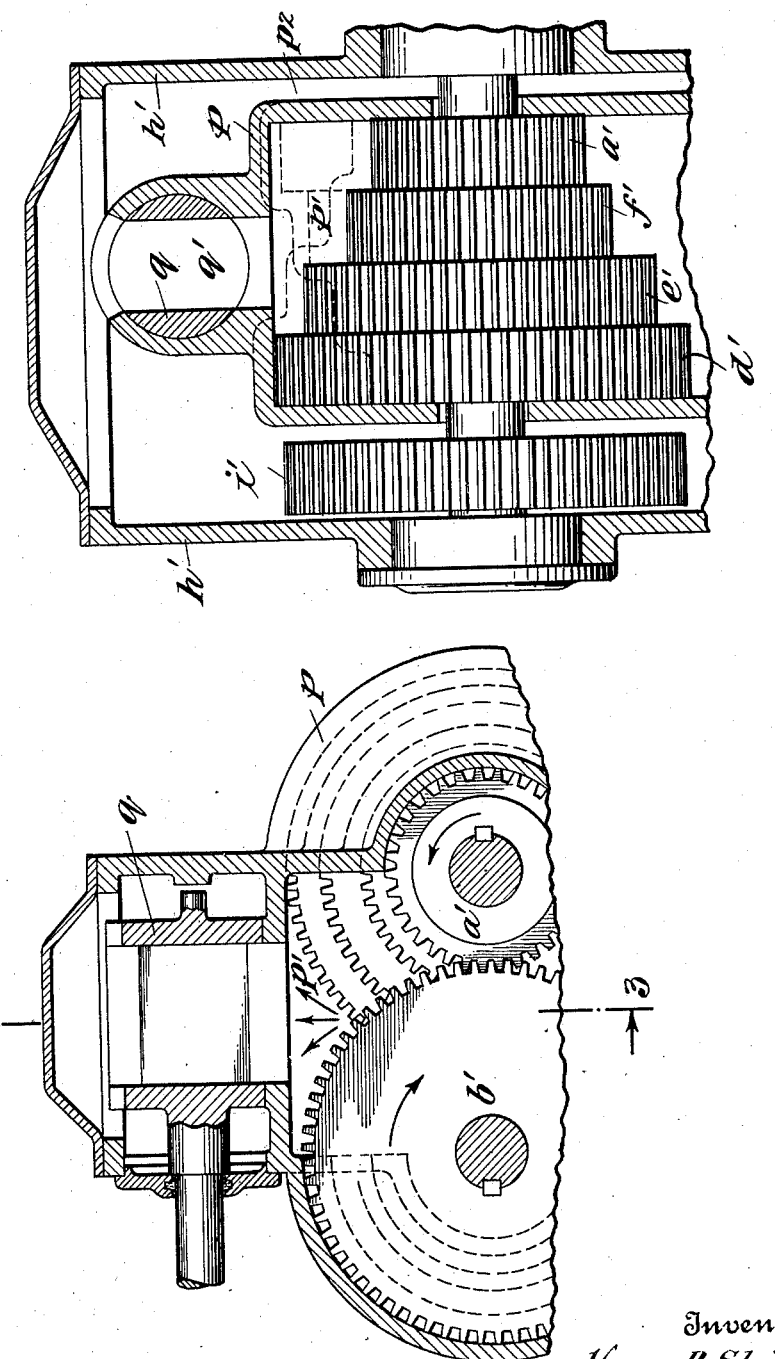
Inventor:
Henry B. Shields
By his Attorneys
Redding, Greeley, O'Shea & Campbell Patented Apr. 15, 1930

1,754,286

UNITED STATES PATENT OFFICE

HENRY B. SHIELDS, OF FREEPORT, NEW YORK, ASSIGNOR TO INTERNATIONAL MOTOR COMPANY, OF NEW YORK, N. Y., A CORPORATION OF DELAWARE

TRANSMISSION BRAKE

Original application filed March 23, 1926, Serial No. 96,677. Divided and this application filed November 21, 1927. Serial No. 234,588.

This application is a division of my copending application Serial No. 96,677 filed March 23, 1926 in which there is set forth and described a transmission or change speed mechanism for self-propelled vehicles of such a construction as to overcome the difficulties usually encountered in shifting gears. According to the invention disclosed in my said copending application the cooperating gears of various ratios are carried respectively upon a countershaft and a driven shaft journaled in a suitable transmission housing as is customary, but instead of one of the sets of gears being slidably mounted upon one of the shafts for engagement selectively with the cooperating gears upon the other shaft, the respective pairs of gears are so mounted as to be always in mesh and the gears upon one shaft, for instance the driven shaft, are carried upon a series of concentric sleeves, the selective rotation of the respective sleeves being effected from the driving shaft through the instrumentality of clutching mechanism of a simplified and improved design. There is also set forth in my said copending application (and with this the present application is specifically concerned) a means for braking or retarding the propeller shaft by utilizing the constantly meshed gears as a plurality of fluid pumps, the resistance to the flow of fluid on what may be called the outlet side of such pumps retarding the rotation of the gearing, and hence the propeller shaft, and thus braking the vehicle.

A preferred embodiment of the invention has been illustrated in the accompanying drawings to which reference should be had in connection with the following detailed description. In the drawings:

Figure 1 is a longitudinal sectional view showing the change speed mechanism disposed within a transmission housing and the clutching devices whereby the various gear ratios are rendered effective.

Figure 2 is a view taken in the plane indicated by the line 2—2 in Figure 1 and looking in the direction of the arrows and showing the utilization of the enmeshing gears as fluid pumps for the purpose of effecting a retardation of the rotation thereof to brake the vehicle.

Figure 3 is a longitudinal sectional view taken in the plane indicated by the line 3—3 in Figure 2 and looking in the direction of the arrows.

Referring first to Figure 1 the change speed mechanism is illustrated as including a countershaft $a$ and a driven shaft $b$ which is journaled in a recessed end $c$ of a shaft $c'$ rotated by the prime mover. The propeller shaft is, of course, operatively connected, preferably by a universal joint, with the right-hand end as viewed in Figure 1 of the driven shaft $b$. The drive is effected in general from the driving shaft $c'$ through a suitably proportioned pair of gears to the countershaft $a$ and from the countershaft by another suitably proportioned pair of gears including the gear $b'$ to the driven shaft $b$. It is proposed to afford three different speeds in a forward direction as well as a direct drive and a reverse drive by the transmission according to the present invention. To this end three gears of different diameters $d$, $e$ and $f$, respectively, are illustrated as carried with the driven shaft $b$ and as meshing with the respective gears $d'$, $e'$ and $f'$ on the countershaft. Gears $d'$, $e'$, $f'$ and a gear $a'$ meshing with the gear $b'$, are keyed to the countershaft $a$. Preferably, these gears are formed on a unitary carrier member $g$ keyed as at $g'$, $g^2$ to the countershaft $a$. Each of the gears $d$, $e$ and $f$ are carried upon respective concentric sleeves $d^2$, $e^2$ and $f^2$ surrounding shaft $b$ and these sleeves are of such length as to extend outwardly beyond the front wall $h$ of the transmission housing for selective engagement with the driving shaft $c'$.

The reverse drive is effected by a gear $i$ on the shaft $b$ rotating gear $i'$ on countershaft $a$ through the instrumentality of another gear, not shown, in the usual manner. Gear $i$ is also carried upon a concentric sleeve $i^2$ extending without the housing. The outer extremities of the concentric sleeves are splined to fit splines in the flanges $i^3$, $d^3$, $e^3$ and $f^3$, respectively, and to these flanges are secured discs, $i^4$, $d^4$, $e^4$, $f^4$, respectively, carrying clutching discs $i^5$, $d^5$, $e^5$ and $f^5$ whereby the drive at a given speed is attained in the following manner. When a predetermined speed is desired, the required gear ratio is effected by causing the respective sleeve to rotate in synchronism with driving shaft $c'$. In the illustrated embodiment this is effected by selective clutching mechanism comprising a flange $c^2$ formed on the end of driving shaft $c$ and carrying a cylindrical or annular element $j$, having an inwardly extending flange $j'$ centrally thereof and carrying at its outer edge an inwardly extending flange $k$. Journaled in the flanges $c^2$, $j'$ and $k$ are a series of rods $l$, $m$ and $n$ which have supported thereon in suitable fashion friction discs $l'$, $m'$ and $n'$. Rods $l$, $m$ and $n$ are respectively connected to levers $l^2$, $m^2$ and $n^2$ fulcrumed as at $c^3$ upon the bracket $c^4$ so that through the instrumentality of one of the levers movement of the rod will bring one of the friction discs $l'$, $m'$ and $n'$ into engagement with one of the adjacent friction discs $f^5$, $e^5$, $d^5$, $i^5$ or $o^5$ as the case may be, the friction disc $o^5$ being carried upon shaft $b$ where direct drive may be effected. Thus one of the aforesaid discs may be frictionally retained in contact with flange $c^2$ or its associated parts whereby the friction discs and the corresponding concentric sleeve may be caused to rotate in unison. The actuating mechanism for the levers $l^2$, $m^2$ and $n^2$ may take any desired form. In the illustrated embodiment a plurality of concentric sleeves $l^3$, $m^3$ and $n^3$ are disposed upon the end of shaft $c'$ and are formed with sockets to receive the end of the levers and with other sockets to receive the end of actuating fingers L, M and N. The clutching discs $l'$, $m'$ and $n'$ are each provided with not less than 3 rods $l$, $m$ and $n$ and three levers $l^2$, $m^2$ and $n^2$, making nine rods and nine levers evenly spaced about the face of the flange $e^2$. This is to insure an even distribution of pressure to the discs $l'$, $m'$ and $n'$.

Assuming that it is desired to effect a direct drive between the driving shaft $c'$ and the driven shaft $b$ lever L will be moved to the right as viewed in Figure 1 thereby moving concentric sleeve $l^3$ in that direction and effecting movement of the lever $l^2$ about the fulcrum $c^3$ to cause movement of rod $l$ to the left carrying with it the disc $l$ and clamping the disc $o^5$ firmly against the flange $c^2$. Disc $o^5$ is thus frictionally engaged between the adjacent faces of flanges $c^2$ and disc $l'$ and the two shafts $c'$ and $b$ are caused to rotate in unison.

If it is desired that shaft $b$ rotate at a speed of rotation different from that of shaft $c'$ this is accomplished by driving through one of the pairs of gears $d$, $e$ or $f$. To this end one of the fingers, say M, is moved to the left moving sleeve $m^3$ in that direction and causing the movement of the lever $m^2$ about its fulcrum to cause movement of rod $m$ to the right thereby clamping in frictional engagement the disc $d^5$ between discs $m'$ and $k$. Disc $d^5$ is thus caused to rotate in unison with the flange $c^2$ thereby causing rotation of the concentric sleeve $d^2$ which carries the gear $d$. Rotation of gear $d$ say in clockwise direction causes rotation of the gear $d'$ say in counterclockwise rotation and similar rotation of the jack shaft $a$. Rotation of countershaft $a$ in counterclockwise direction causes the rotation in counterclockwise direction of the gear $a'$ keyed thereon which in turn causes rotation, say in clockwise direction of the gear $b'$ and the shafts $b$ at a speed dependent upon the ratios of the gears $d$, $d'$ and $b$, $b'$. For different speeds of rotation of the propeller shaft $b$ different gear ratios are availed of as will be understood, the pair of gears offering the desired ratio being rendered effective in a similar manner. It is understood that only one clutch may be engaged at one time and this will be taken care of by the operating mechanism. It is thought from the foregoing description that the operation of the device will be apparent.

The retardation or braking of the propeller shaft $b$, as a means of retarding the travel of the vehicle, is accomplished by enclosing the gears in a housing $p$ which closely surrounds the gears as indicated in Figure 2. The housing is designed to serve as a lubricant reservoir so that the gears turn constantly in a bath of oil and due to the form taken by the housing each pair of meshing gears may serve as a fluid pump, drawing fluid from below and forcing it upwardly in the space $p'$ above the gears. Normally, the lubricant will be returned through the passages $p^2$ to the bottom of the reservoir. If it is desired to retard the rotation of the gears an obstruction may be placed in the passage $p^2$ so that the flow of lubricant is retarded and the back pressure will retard the rotation of the gearing. In the illustrated embodiment this obstruction may take the form of a valve $q$ having a passage $q'$ therein leading from the space $p'$ above the gears to the channel $p^2$ formed between housing $p$ and the walls of the transmission housing $h'$. Thus when valve $q$ is open no obstruction is afforded the flow of lubricant from above the gears through passage $p^2$ to the reservoir below the gears. By partly or entirely closing the valve $q$ this flow of fluid is obstructed and the rotation of the gears retarded as has been explained.

Thus there has been provided a transmission in which there are no gears to shift, the constantly meshed gears being adapted to act as fluid pumps in the manner described to retard the rotation of the propeller shaft and thus brake the vehicle. The construction as a whole is compact and easy of manufacture and may be employed to take the place of the ordinary flywheel, clutch, transmission and rear wheel brakes, when applied to vehicles having separate front wheel brakes.

No limitation upon the spirit or scope of the invention is intended except as indicated in the following claim.

What I claim is:

In a transmission mechanism, in combination, a countershaft, a driven shaft, gears carried with the respective shafts and always meshing with each other, whereby the lubricant may be pumped on rotation of said gears, means to cause selected gears to transmit motion to the driven shaft, a housing enclosing the gears and conforming closely to the outer extremities of the gears, a lubricant outlet in the housing, means permitting the lubricant pumped to return to the suction side of the gears, and means to restrict the flow of the lubricant.

This specification signed this 18th day of November, A. D. 1927.

HENRY B. SHIELDS.